April 13, 1965  YIH-HUNG LEE  3,178,186
THREE-WAY DISSECTION PUZZLE
Filed Sept. 28, 1962  2 Sheets-Sheet 1
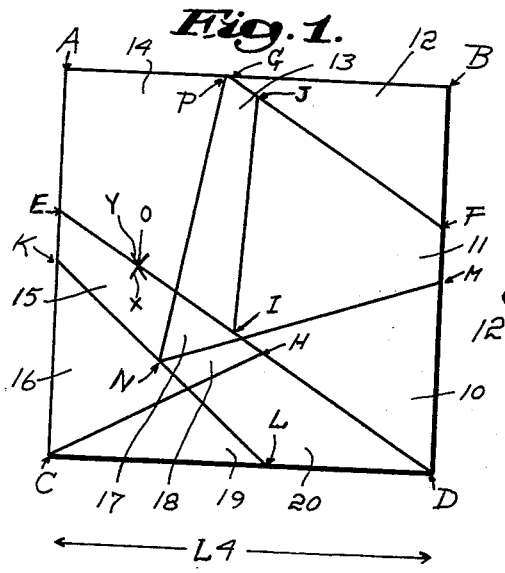
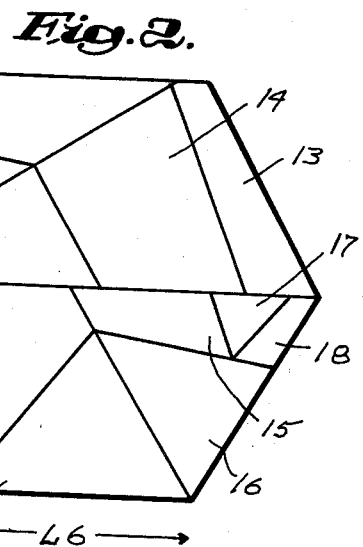
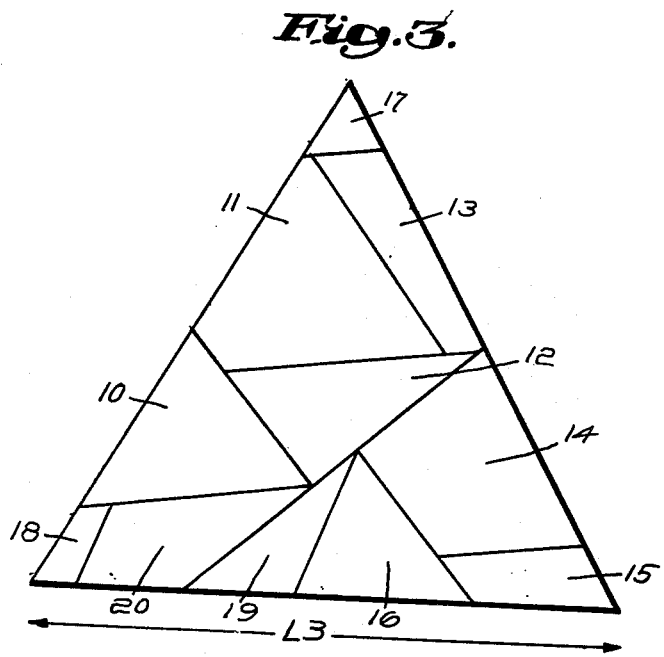
Inventor:
Yih-hung Lee,
by Abbot Spear,
Attorney April 13, 1965     YIH-HUNG LEE     3,178,186
THREE-WAY DISSECTION PUZZLE
Filed Sept. 28, 1962     2 Sheets-Sheet 2
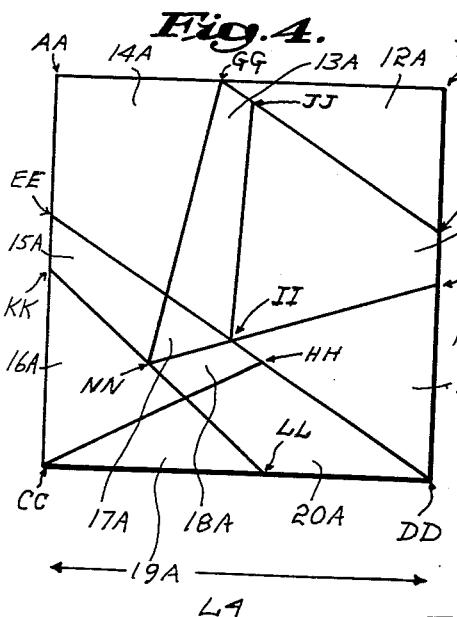
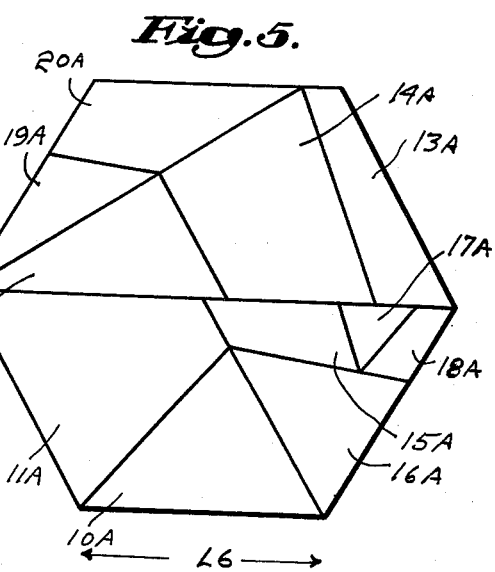
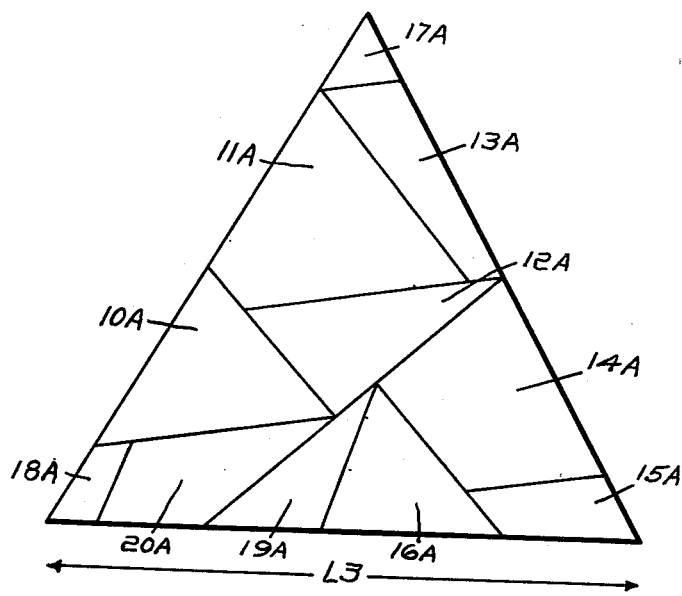
Inventor:
Yih-hung Lee,
by Abbot Spear
Attorney

United States Patent Office 3,178,186
Patented Apr. 13, 1965

3,178,186
THREE-WAY DISSECTION PUZZLE
Yih-hung Lee, Wallace Ave., Fitchburg, Mass.
Filed Sept. 28, 1962, Ser. No. 226,973
4 Claims. (Cl. 273—157)

This invention relates to puzzles of the type having a series of sections differing as to the number of sides and as to size and shape, the sections being capable of being assembled to form different geometrical figures.

Puzzles of this type are entertaining provided that they consist of enough sections to present a challenge to a person's skill and provided that the figures to be formed afford objectives consistent therewith.

The object of this invention is to provide a series of multi-lateral sections differing as to the number of their sides and their size and shape with the series being capable of being assembled to establish a square, a hexagon, and a triangle that is at least a close approximation of an isosceles triangle, the area of the figures being equal and the sections being eleven in number although, of course, each section may consist of more than one part.

The essential characteristics of the sections are best defined with reference to a square formed from them with their abutting edges defining lines the first of which passes from a first corner through a point which is the intersection of arcs swung from the first corner and a second corner, the radius of the arcs being 1.5L6 wherein L6 is the length of a side of the hexagon, the first line intersecting the first side of the square, the side opposite the first and second corners, at a point parallel to a third point on the second side, the side between said first and second corners. The abutting edges of the sections define a second line from the third point which is parallel to the first named line and intersects the third side of the square, the side between the second corner and a third corner. Other characteristic lines include a third line from the fourth corner to the first line, and a fourth line from a second point on the first line to the second line, the distance between the second point on the first line and the first corner and the length of the third and fourth lines being equal. The sections of the square also define a fifth line from the midpoint of the first side to a point on the fourth side providing a length of the fourth side between the last named point and the first corner that is approximately equal to the distance between the intersection of the second named line with the third side and the third corner, a sixth line from the midpoint of the second side through the first named line to a point on the fifth line, the sixth line passing approximately through the second point on the first line, and a seventh line from the last named point substantially to the point of intersection of the second named line and the third side.

In the accompanying drawings, there are shown illustrative embodiments of the invention from which these and other of its objectives, novel features, and advantages will be readily apparent.

In the drawings:

FIGURE 1 is a plan view of a puzzle in accordance with the invention with the pieces arranged to form a square, FIGURE 2 is a plan view illustrating the pieces assembled to form a hexagon, FIGURE 3 is a plan view illustrating the assembly of the pieces to form an equilateral triangle, FIGURE 4 is a plan view of a puzzle in accordance with another embodiment of the invention with the pieces arranged to form a square, and FIGURES 5 and 6 are plan views of the pieces assembled to form, respectively, a hexagon and a triangle that is a close approximation of an isosceles triangle.

By way of introduction, it will be appreciated that, given a square having a side length L4, the length, of a side L3 of an equilateral triangle of the same area as the square, and the length of a side L6 of a hexagon of the same area can be readily determined. By way of illustration, if L4=four inches, then L3=6.0787 inches and L6=2.4816 inches.

Referring now to FIGURE 1, the square A, B, C, D having a side length of L4 may be divided into eleven sections, 10, 11, 12, 13, 14, 15, 16, 17, 18, 19, and 20, that may be reassembled to form the hexagon of FIGURE 2, having a side length of L6, or the equilateral triangle of FIGURE 3, having a side length L3, by cutting it in the following manner.

A first line D–E is drawn through the point O from the corner D, the point O being the intersection of arcs X and Y swung from the corners D and B, respectively, the radius of the arcs being 1.5L6. The part B–F of the side B–D is made equal to the part A–E of the side A–C and a second line G–F is drawn that is parallel to the line D–E.

A third line extends from the corner C to the point H on the first line D–E and a fourth line extends from the point I on the first line D–E to the point J on the second line F–G with the distance D–I and the length of the lines C–H and I–J being equal to L6. A fifth line extends from the midpoint K of the side A–C to the point L on the side C–D, a sixth line extends from the midpoint M on the side B–D to a point N on the fifth line, and a seventh line extends from the point N to the point P on the side A–B. The fifth, sixth, and seventh lines being equal to ½L3.

The eleven sections can be assembled to form the hexagon of FIGURE 2 or the equilateral triangle shown in FIGURE 3 and when the square of FIGURE 1 is formed abutting edges of the section redefine the above described seven lines.

Before considering the embodiment of the invention illustrated by FIGURES 4–6, it will be helpful to note that, in dividing the square of FIGURE 1, it is necessary to know the measurements of both L3 and L6, that the distance A–P is not exactly equal to the distance L–D, that the point P is close to but does not coincide with the point G and that the point I is close to but not at the intersection of the lines D–E and M–N.

In FIGURE 4, the section 10A, 11A, 12A, 13A, 14A, 15A, 16A, 17A, 18A, 19A, and 20A of the square AA, BB, CC, DD are formed in the following manner:

The first line DD–EE is formed in exactly the same manner as the first line D–E of FIGURE 1 as in the second line FF–GG, the third line CC–HH, and the fourth line II–JJ, and the fifth line KK–LL. In FIGURE 4, however, the line MM–NN is drawn directly through the point II and the seventh line is drawn directly from the point NN to the point GG.

It will be noted that the line KK–LL is equal to ½L3 the length of a side of the triangle of FIGURE 6, and while the distance LL–DD is so close to the distance AA–GG that they may be made the same, enabling the lines KK–LL to be drawn without determining the length of a side of the triangle of FIGURE 6. In any event, the formation of sections as described in connection with FIGURE 4 does not result in the three angles or the three sides of the triangle of FIGURE 6 to be exactly equal but they are a close approximation thereof.

I claim:

1. A geometrical puzzle consisting of eleven multi-lateral sections capable of being arranged to form a square, a hexagon, and a triangle that is at least a close approximation of an isosceles triangle, said sections, when arranged to form a square, have abutting edges defining a first line which passes from a first corner through a point which is the intersection of arcs swung from said first corner and a second corner, the radius of the arcs being 1.5L6 wherein L6 is the length of a side of said hexagon, said line intersecting the first side of the square, the side opposite said corners, at a point parallel to a third point on the second side, the side between said first and second corners, a second line from said third point which is parallel to the first named line and intersects the third side of the square, the side between said second corner and a third corner, a third line from the fourth corner to the first line, a fourth line from a second point on the first line to said second line, the distance between said second point on said first line and said first corner and the length of said third and fourth lines being equal to L6, a fifth line from the midpoint of the first side to a point on the fourth side providing a length of said fourth side between said last named point and said first corner that is approximately equal to the distance between the intersection of the second named line with said third side and said third corner, a sixth line from the midpoint of the second side through the first named line to a point on the fifth line, said sixth line passing approximately through the second point on the first line, and a seventh line from the last named point substantially to the point of intersection of the second named line and the third side.

2. A geometrical puzzle consisting of eleven multilateral sections capable of being arranged to form a square, a hexagon, and an equilateral triangle, said sections, when arranged to form a square, have abutting edges defining a first line which passes from a first corner through a point which is the intersection of arcs swung from said first corner and a second corner, the radius of the arcs being 1.5L6 wherein L6 is the length of a side of said hexagon, said line intersecting the first side of the square, the side opposite said corners, at a point parallel to a third point on the second side, the side between said first and second corners, a second line from said third point which is parallel to the first named line and intersects the third side of the square, the side between said second corner and a third corner, a third line from the fourth corner to the first line, a fourth line from a second point on the first line to said second line, the distance between said second point on said first line and said first corner and the length of said third and fourth lines being equal to L6, a fifth line from the midpoint of the first side to a point on the fourth side providing a length of said fourth side between said last named point and said first corner that is approximately equal to the distance between the intersection of the second named line with said third side and said third corner, a sixth line from the midpoint of the second side through the first named line to a point on the fifth line, said sixth line passing near the second point on the first line, and a seventh line from the last named point to a point close to the point of intersection of the second named line and the third side, said fifth, sixth, and seventh lines all being equal to ½L3 wherein L3 is the length of a side of said equilateral triangle.

3. A geometrical puzzle consisting of eleven multilateral sections capable of being arranged to form a square, a hexagon, and a triangle that is at least a close approximation of an equilateral triangle, said sections, when arranged to form a square, have abutting edges defining a first line which passes from a first corner through a point which is the intersection of arcs swung from said first corner and a second corner, the radius of the arcs being 1.5L6 wherein L6 is the length of a side of said hexagon, said line intersecting the first side of the square, the side opposite said corners, at a point parallel to a third point on the second side, the side between said first and second corners, a second line from said third point which is parallel to the first named line and intersects the third side of the square, the side between said second corner and a third corner, a third line from the fourth corner to the first line, a fourth line from a second point on the first line to said second line, the distance between said second point on said first line and said first corner and the length of said third and fourth lines being equal to L6, a fifth line from the midpoint of the first side to a point on the fourth side between said last named point and said first corner that is approximately equal to the distance between the intersection of the second named line with said third side and said third corner, said fifth line being equal to ½L3 wherein L3 is the length of a side of said triangle, a sixth line from the midpoint of the second side through the first named line to a point on the fifth line, said sixth line passing through the second point on the first line, and a seventh line from the last named point to the point of intersection of the second named line and the third side.

4. A geometrical puzzle consisting of eleven multilateral sections capable of being arranged to form a square, a hexagon, and a triangle that is at least a close approximation of an equilateral triangle, said sections, when arranged to form a square, have abutting edges defining a first line which passes from a first corner through a point which is the intersection of arcs swung from said first corner and a second corner, the radius of the arcs being 1.5L6 wherein L6 is the length of a side of said hexagon, said line intersecting the first side of the square, the side opposite said corners, at a point parallel to a third point on the second side, the side between said first and second corners, a second line from said third point which is parallel to the first named line and intersects the third side of the square, the side between said second corner and a third corner, a third line from the fourth corner to the first line, a fourth line from a second point on the first line to said second line, the distance between said second point on said first line and said first corner and the length of said third and fourth lines being equal to L6, a fifth line from the midpoint of the first side to a point on the fourth side providing a length of said fourth side between said last named point and said first corner that is equal to the distance between the intersection of the second named line with said third side and said third corner, the length of said fifth line being close to ½L3 wherein L3 is the length of the side of said triangle, a sixth line from the midpoint of the second side through the first named line to a point on the fifth line, said sixth line passing through the second point on the first line, and a seventh line from the last named point to the point of intersection of the second named line and the third side.

References Cited by the Examiner
UNITED STATES PATENTS 1,565,099   12/25   Nierodka _____ 273—157

OTHER REFERENCES

The Australian Mathematics Teacher, vol. 7, pages 7–10, 1951; vol. 9, pages 17–21, 1953. Articles entitled "Geometric Dissections" by Harry Lindgren.

Scientific American, vol. 205, No. 5, November 1961, T1S5, pages 158, 160, 162, 164, 166, 168, 169.

DELBERT B. LOWE, *Primary Examiner*.